(12) United States Patent
An

(10) Patent No.: US 11,955,650 B2
(45) Date of Patent: Apr. 9, 2024

(54) BATTERY-MOUNTING STRUCTURE

(71) Applicants: Hyundai Motor Company, Seoul (KR); Kia Corporation, Seoul (KR)

(72) Inventor: Seung Won An, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 138 days.

(21) Appl. No.: 17/406,557

(22) Filed: Aug. 19, 2021

(65) Prior Publication Data

US 2022/0190414 A1 Jun. 16, 2022

(30) Foreign Application Priority Data

Dec. 16, 2020 (KR) .................. 10-2020-0176150

(51) Int. Cl.
| | |
|---|---|
| *B60K 1/04* | (2019.01) |
| *B60R 16/04* | (2006.01) |
| *B62D 25/20* | (2006.01) |
| *H01M 50/20* | (2021.01) |

(52) U.S. Cl.
CPC ............. *H01M 50/20* (2021.01); *B60R 16/04* (2013.01); *B62D 25/20* (2013.01); *B60G 2300/50* (2013.01); *B60K 2001/0438* (2013.01)

(58) Field of Classification Search
CPC . B60K 1/04; B60K 2001/0438; H01M 50/20; H01M 50/264; H01M 2220/20; B60R 16/04; B62D 25/20; B62D 25/025; B60L 50/64
See application file for complete search history.

(56) References Cited

U.S. PATENT DOCUMENTS

| | | | |
|---|---|---|---|
| 10,399,425 B2* | 9/2019 | Okamura ................ | B60L 50/64 |
| 2013/0270864 A1* | 10/2013 | Young ..................... | B60K 1/04 |
| | | | 296/187.12 |
| 2015/0197144 A1* | 7/2015 | Jarocki ................... | B60L 50/66 |
| | | | 180/68.5 |
| 2019/0359260 A1* | 11/2019 | Tsuyuzaki ........... | H01M 50/249 |

FOREIGN PATENT DOCUMENTS

KR 20120033181 A 4/2012

* cited by examiner

*Primary Examiner* — Jason D Shanske
*Assistant Examiner* — James J Triggs
(74) *Attorney, Agent, or Firm* — SLATER MATSIL, LLP

(57) ABSTRACT

An embodiment battery-mounting structure includes a side sill, a mounting bracket connected to the side sill, the mounting bracket being deformable by external force, a connecting member coupled to the mounting bracket and spaced apart from the side sill by a predetermined distance, and a battery assembly including a side flange coupled to the connecting member, the battery assembly being configured to receive a high-voltage battery.

20 Claims, 4 Drawing Sheets

BATTERY-MOUNTING STRUCTURE

CROSS-REFERENCE TO RELATED APPLICATIONS

This application claims the benefit of Korean Patent Application No. 10-2020-0176150, filed on Dec. 16, 2020, which application is hereby incorporated herein by reference.

TECHNICAL FIELD

The present disclosure relates to a mounting structure of a battery for an eco-friendly vehicle.

BACKGROUND

An eco-friendly vehicle, such as an electric vehicle or a hybrid vehicle, is necessarily provided with a motor for driving the vehicle and a high-voltage battery for supplying power to the motor.

In recent years, because the size of a battery has increased for increased battery capacity, a high-voltage battery is mounted on the floor panel of a vehicle, rather than being disposed in a trunk, as is conventional. Specifically, a battery case including a battery therein is coupled to the lower surface of the underfloor panel of a vehicle body and is mounted to each side sill by means of bolts.

As a member extending along a lateral side of a lower portion of a vehicle in a longitudinal direction of the vehicle, the side sill serves to absorb or alleviate collision impact by deforming in the event that the vehicle is involved in a lateral collision. Accordingly, when impulsive force is applied to a lateral side of the vehicle, the impulsive force is transmitted to a battery through the side sill or the vehicle body. Hence, required is a means to protect the battery in the event of a lateral collision.

For protection of the battery, a reinforcing structure is applied to the side sill. Although the reinforcing structure can protect the battery, there are problems in that the total weight and cost of the vehicle are inevitably increased and a traveling range is decreased due to the additional reinforcing member.

Korean Unexamined Patent Application Publication No. 10-2012-0033181 describes information related to the present subject matter.

The above information disclosed in this Background section is only for enhancement of understanding of the background of the invention and therefore it may contain information that does not form the prior art that is already known to a person of ordinary skill in the art.

SUMMARY

The present disclosure relates to a mounting structure of a battery for an eco-friendly vehicle. Particular embodiments relate to a battery-mounting structure designed to protect a battery coupled to the lower portion of a floor panel in the event of a lateral collision.

Embodiments of the present invention can solve problems associated with the prior art. An embodiment of the present invention provides a battery-mounting structure capable of effectively protecting a battery without excessive reinforcement of a side sill.

Another embodiment of the present invention provides a battery-mounting structure capable of reducing the weight and cost of a vehicle.

A further embodiment of the present invention provides a battery-mounting structure capable of increasing a traveling range of a vehicle.

The embodiment of the present invention are not limited to the above-mentioned embodiments, and other embodiments of the present invention, which are not mentioned above, will be clearly understood by those skilled in the art, to which the present invention belongs, from the following descriptions of preferred embodiments.

One embodiment of the present invention provides a battery-mounting structure including a side sill, a mounting bracket being connected to the side sill and deformable by external force, a connecting member coupled to the mounting bracket and spaced apart from the side sill by a predetermined distance, and a battery assembly including a side flange coupled to the connecting member and receiving a high-voltage battery.

Other aspects and preferred embodiments of the invention are discussed infra.

It is to be understood that the term "vehicle" or "vehicular" or other similar term as used herein is inclusive of motor vehicles in general, such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative-fuel vehicles (e.g. fuels derived from resources other than petroleum). As referred to herein, a hybrid vehicle is a vehicle that has two or more sources of power, for example, a vehicle powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof, illustrated in the accompanying drawings which are given hereinbelow by way of illustration only, and thus are not limitative of the present invention, and wherein.

Figure 1:
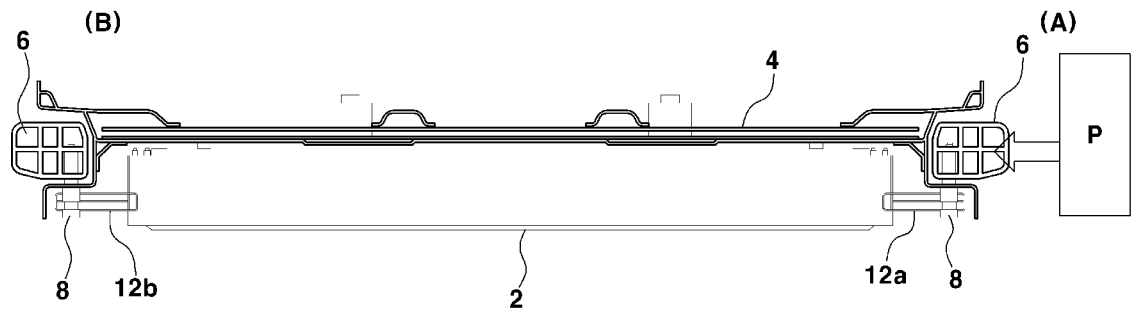
FIG. 1 is an example showing that a high voltage battery is mounted to the underfloor panel of a vehicle.

It should be understood that the appended drawings are not necessarily to scale, presenting a somewhat simplified representation of various preferred features illustrative of the basic principles of embodiments of the invention. The specific design features of embodiments of the present invention as disclosed herein, including, for example, specific dimensions, orientations, locations, and shapes, will be determined in part by the particular intended application and use environment.

In the figures, the reference numbers refer to the same or equivalent parts of embodiments of the present invention throughout the several figures of the drawings.

DETAILED DESCRIPTION OF ILLUSTRATIVE EMBODIMENTS

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

As illustrated in FIG. 1, a battery case 2 including a battery therein is disposed below an underfloor panel 4, and is fastened to side sills 6 via mounting portions 12a and 12b by means of bolts.

A side pole crash test for a vehicle is performed in order to simulate a lateral collision situation and evaluate the collision performance by causing the vehicle to collide with a fixed pole P. Because the impulsive force caused by the lateral collision is directly transmitted to the battery case 2 in the lateral collision situation, it is hard to avoid breakage of the battery caused by the lateral collision and the risk of fire resulting from breakage of the battery. Accordingly, in order to protect the battery by reducing deformation of the side sills caused by the lateral collision, additional reinforcing members are applied to the side sills.

FIG. 1 is a cross-sectional view of the portion of the vehicle in a lateral direction, to which the battery is mounted. In FIG. 1, the side of the vehicle, which directly collides with the fixed pole P, is noted by (A), and the opposite side of the vehicle is denoted by (B).

The mounting portion 12b, which is positioned at the side (B) of the vehicle opposite the side (A) of the vehicle that collides with the pole P, is constructed to have a deformation-resistant structure, that is, is constructed not to be capable of being pushed or deformed. Accordingly, the current technology is intended to protect the battery by relieving deformation of the side sills due to a collision with a focus on reinforcement of the side sills themselves.

Because this structure provided limited deformation space, it is necessary to reinforce the side sills to an excessive extent. This tends to increase total weight and cost of the vehicle and decreases traveling range.

Embodiments of the present invention provide a structure in which the mounting portion 12b of the opposite side B of the vehicle is pushed in the event of a lateral collision, thereby ensuring additional deformation space. Consequently, it is possible to provide an optimal structure which provides strength reinforcement.

Hereinafter, embodiments of the present invention will be described in detail with reference to the accompanying drawings.

Figure 2:
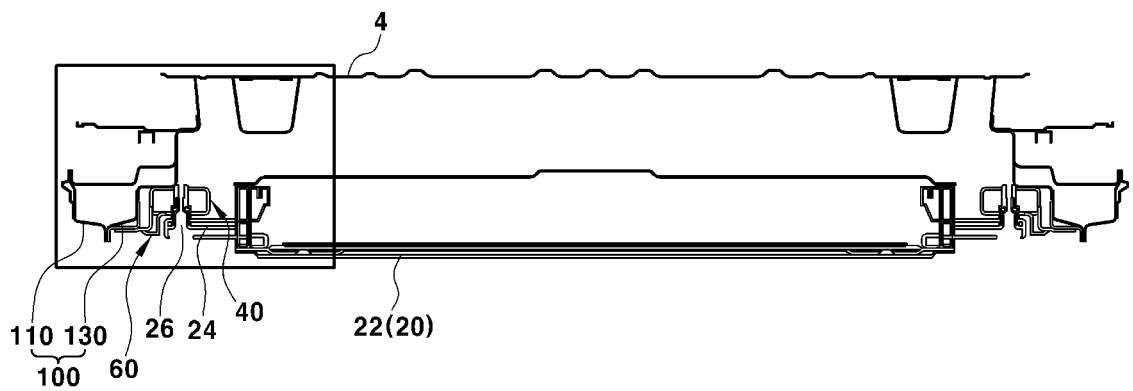
FIG. 2 is a cross-sectional view of a vehicle in a lateral direction of the vehicle, including the battery-mounting structure according to embodiments of the present invention.
Figure 3:
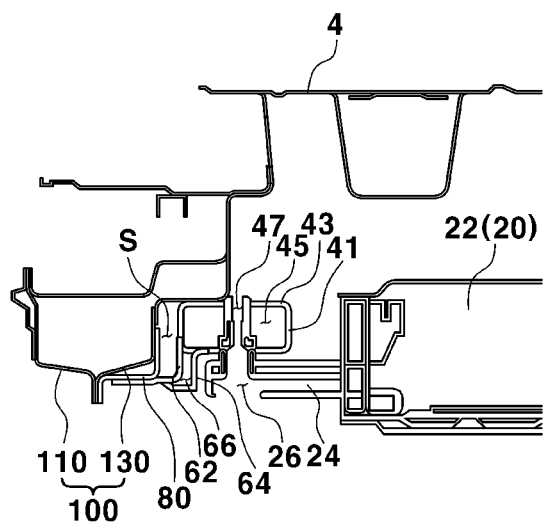
FIG. 3 is an enlarged view of the boxed region in FIG. 2.
Figure 4:
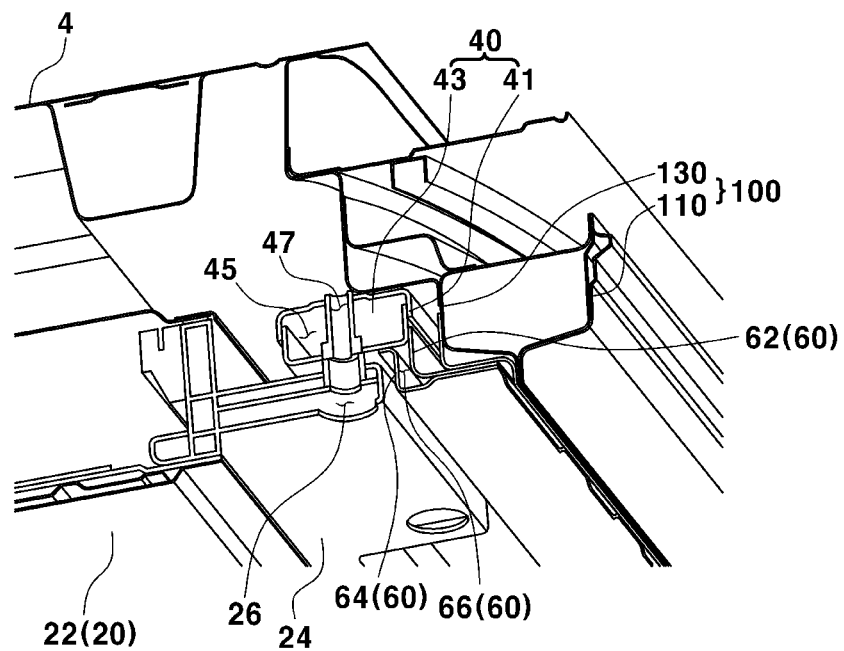
FIG. 4 is a perspective view of the vehicle including the battery-mounting structure according to embodiments of the present invention.

FIG. 2 is a cross-sectional view taken along the lateral direction of a vehicle including the battery-mounting structure according to embodiments of the present invention. FIG. 3 is an enlarged view of the boxed region in FIG. 2. FIG. 4 is a perspective view of the vehicle including the battery-mounting structure according to embodiments of the present invention.

Referring to FIGS. 2 to 4, the battery-mounting structure according to embodiments of the present invention includes a battery assembly 20, a connecting member 40, and a mounting bracket 60.

The battery assembly 20 includes a battery and a battery housing 22. The battery is received in the battery housing 22 and is protected thereby.

The battery housing 22 is provided at the two lateral sides thereof with side flanges 24 which project from the two lateral sides of the battery housing 22. The side flanges 24 extend along the battery housing 22 in the longitudinal direction of the vehicle, and the battery assembly 20 is mounted on the vehicle via the side flanges 24.

Each of the side flanges 24 has a plurality of mounting holes 26. For connection of the battery assembly 20, each of the side flanges 24 is provided with the mounting holes 26, which are formed through the side flange 24. The mounting holes 26 are arranged at a certain interval in the longitudinal direction of the side flange 24.

The connecting member 40 is connected to the battery assembly 20 and is spaced apart from the side sill 100 by a predetermined distance S. In an embodiment of the present invention, the connecting member 40 includes a pair of vertical elements 41, a pair of horizontal elements 43 and a closed space 45. The vertical elements 41 are oriented substantially vertically to face each other, and the horizontal elements 43 connect the pair of vertical elements 41 to each other and are oriented substantially laterally. By virtue of connection between the pair of vertical elements 41 and the pair of horizontal elements 43, the closed space 45 is defined in the connecting member 40.

The connecting member 40 extends parallel to the side flange 24 in the longitudinal direction of the vehicle. Overlapping the side flange 24, the connecting member 40 is coupled to the side flange 24 by means of bolts (not shown). The connecting member 40 has a plurality of coupling holes 47, which are formed through the connecting member 40. The coupling holes 47 are spaced apart from each other by a predetermined distance for connection with respective mounting holes 26. The plurality of mounting holes 26 are aligned with the plurality of coupling holes 47, and fastening elements are fastened through the mounting holes 26 and the coupling holes 47 in the closed space 45, thereby coupling the connecting member 40 to the side flange 24.

Figure 5:
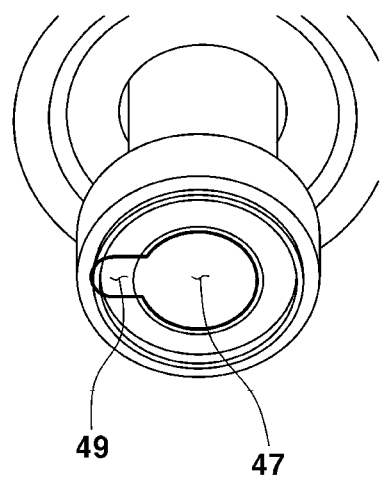
FIG. 5 is a view illustrating an expansion portion formed in a coupling hole in a connecting member.

As illustrated in FIG. 5, in an embodiment of the present invention, each of the coupling holes 47 has an expansion portion 49. The expansion portion 49 has the shape of a keyhole, a part of which is enlarged radially outward. Specifically, the expansion portion 49 is enlarged toward the side sill 100 disposed adjacent or next to the connecting member 40 or in a laterally outward direction of the vehicle. Then the battery assembly 20 may be pushed and displaced toward the side sill opposite the collision-side side sill.

The connecting member 40 is coupled to the mounting bracket 60. The mounting bracket 60 is coupled to the side sill 100. In particular, the mounting bracket 60 may be coupled to the lower portion of the side sill 100. The side sill 100 includes an outer member no and an inner member 130. In a non-limiting example, the mounting bracket 60 is coupled to the lower surface of the inner member 130 of the side sill 100. The mounting bracket 60 may be directly coupled to the side sill 100, or may be coupled to the side sill 100 via an additional mounting member 80. The mounting bracket 60 couples the connecting member 40 to the side sill 100 such that the predetermined distance S is maintained between the connecting member 40 and the side sill 100.

The mounting bracket 60 is deformably constructed. In other words, the mounting bracket 60 is constructed to be deformable in the event of a collision. In an embodiment of the present invention, the mounting bracket 60 includes a first member 62 and a second member 64. The first member 62 and the second member 64 branch from the mounting bracket 60 attached to the side sill 100 and extend therefrom. The first member 62 and the second member 64 collectively define therein a space 660 and are attached to the connecting member 40. The first member 62 is bent at the mounting bracket 60 coupled to the side sill 100 and is attached to the vertical element 41 of the connecting member 40. The second member 64 is bent at the mounting bracket 60 coupled to the side sill 100 and is attached to the horizontal element 43 of the connecting member 40. Although the mounting bracket 60, the first member 62 and the second member 64 are separately denoted by different reference numerals, they may be integrally formed.

Figure 6A:
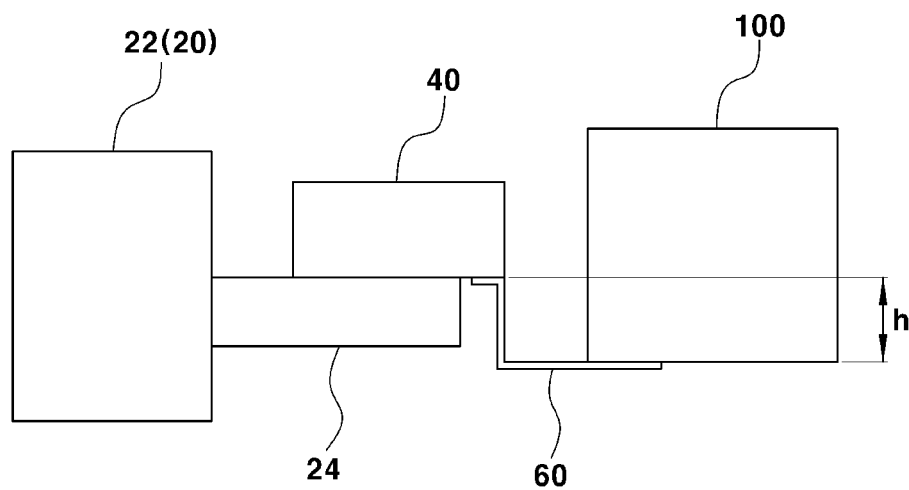
FIGS. 6A and 6B are views schematically illustrating the height difference between the battery assembly, the connecting member and the side sill.
Figure 6B:
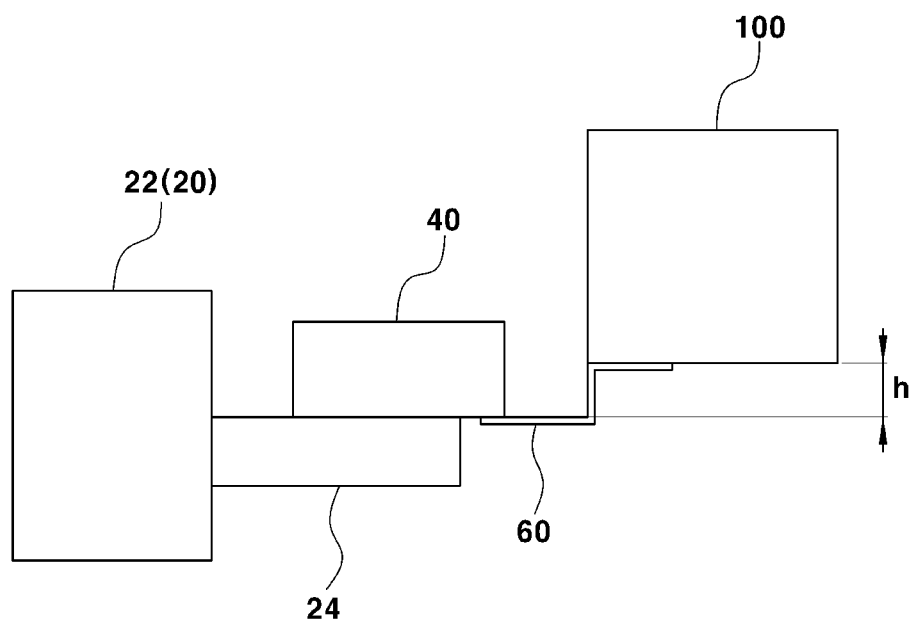

Referring to FIGS. 6A and 6B, according to embodiments of the present invention, a height difference h may be present between the side sill 100 and the connecting member 40. Specifically, the lower surface of the side sill 100 and the lower surface of the connecting member 40 may be set to be different from each other in vertical height. In some embodiments of the present invention, the lower surface of the connecting member 40 may be positioned higher than the lower surface of the side sill 100 in the vertical direction. In some embodiments of the present invention, the lower surface of the connecting member 40 may be positioned lower than the lower surface of the side sill 100 in the vertical direction. Considering that a height difference is present between the battery assembly 20 or the side flange 24 and the side sill 100, embodiments of the present invention are designed such that the battery assembly 20 or the side flange 24 and the side sill 100 are connected to each other via the mounting bracket 60 so as to allow the mounting bracket 60 to be easily deformed in the event of a collision.

The operation of the battery-mounting structure according to embodiments of the present invention will be described with reference to FIG. 7.

Figure 7:
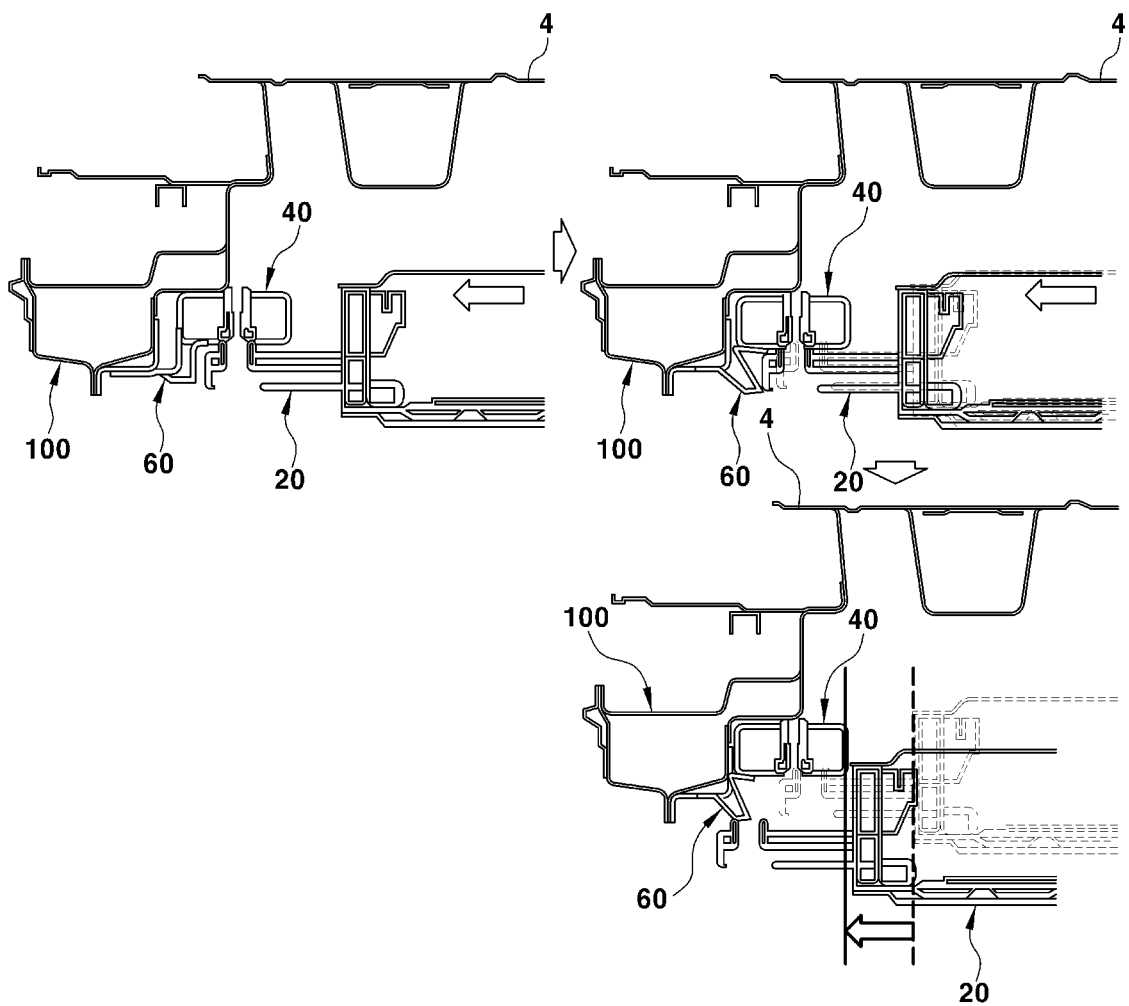
FIG. 7 is a view illustrating operation of the battery-mounting structure according to embodiments of the present invention in the event of a lateral collision.

The leftmost illustration in FIG. 7 presents the battery-mounting structure according to embodiments of the present invention before a collision, in particular, the non-collision side opposite the collision side.

When a collision occurs at the side opposite the side shown in FIG. 7, that is, at the side opposite the non-collision side of the battery-mounting structure, the battery assembly 20 is subjected to leftward force in the direction indicated by the arrow in the drawing and is pushed. At the same time, the connecting member 40 coupled to the side flange 24 of the battery assembly 20 is also pushed leftward. Hence, the distance S between the connecting member 40 and the side sill 100 is reduced, and the connecting member 40 is moved close to the inner member 130 of the side sill 100. As the connecting member 40 is pushed, the mounting bracket 60 is deformed. If the collision force is even greater, the connecting member 40 reaches the side sill 100, and the battery assembly 20 is further pushed toward the non-collision side. At this time, the bolt is moved into the expansion portion 49, and the battery assembly 20 is separated from the connecting member 40.

Since the battery-mounting structure according to embodiments of the present invention is designed such that the battery is pushed or separated so as to ensure an additional collision buffer space in the event of a lateral collision, it is possible to maximize collision performance.

Furthermore, according to embodiments of the present invention, by virtue of the additional collision buffer space, it is possible to optimize reinforcement of the side sill, and thus it is possible to maximize reduction of weight and costs.

As is apparent from the above description, embodiments of the present invention provide a battery-mounting structure capable of efficiently protecting a battery without excessive reinforcement of a side sill.

Furthermore, embodiments of the present invention provide a battery-mounting structure capable of realizing reduction of weight and cost of a vehicle.

In addition, embodiments of the present invention provide a battery-mounting structure capable of increasing a traveling range of a vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A battery-mounting structure comprising:
   a side sill;
   a mounting bracket connected to a lower side of the side sill, the mounting bracket being deformable by external force;
   a connecting member coupled to the mounting bracket and spaced apart from the side sill by a predetermined distance; and
   a battery assembly including a side flange coupled to the connecting member, the battery assembly being configured to receive a high-voltage battery, wherein the battery assembly is configured to move relative to the connecting member and detach from the connecting member when the external force applied to the battery assembly exceeds a threshold external force.

2. The battery-mounting structure of claim 1, wherein the connecting member defines therein a closed space.

3. The battery-mounting structure of claim 1, wherein the side flange includes a mounting hole formed therethrough.

4. The battery-mounting structure of claim 3, wherein:
the connecting member includes a coupling hole formed vertically through the connecting member, and
the side flange and the connecting member are coupled to each other by a fastening element passing through the mounting hole and the coupling hole.

5. The battery-mounting structure of claim 4, wherein the coupling hole includes an expansion portion extending radially outward from the coupling hole.

6. The battery-mounting structure of claim 1, further comprising a mounting member connecting the mounting bracket to the side sill.

7. A battery-mounting structure comprising:
a side sill;
a connecting member spaced apart from the side sill by a predetermined distance;
a mounting bracket connected to the side sill and coupled to the connecting member, wherein the mounting bracket is bent toward the connecting member from the side sill at a certain angle and is deformable by external force; and
a battery assembly including a side flange coupled to the connecting member, the battery assembly being configured to receive a high-voltage battery, wherein the battery assembly is configured to move relative to the connecting member and detach from the connecting member when the external force applied to the battery assembly exceeds a threshold external force.

8. The battery-mounting structure of claim 7, wherein the mounting bracket includes a first member and a second member, and wherein the first member and the second member branch from the mounting bracket and are bent.

9. The battery-mounting structure of claim 8, wherein the first member is bent at a portion of the mounting bracket that is connected to the side sill and is coupled to a vertical surface of the connecting member.

10. The battery-mounting structure of claim 8, wherein the second member is bent at a portion of the mounting bracket that is connected to the side sill and is coupled to a horizontal surface of the connecting member.

11. A vehicle comprising:
an underfloor panel;
a side sill extending in a longitudinal direction of the vehicle;
a mounting bracket connected to the side sill, the mounting bracket being deformable by external force;
a connecting member coupled to the mounting bracket and spaced apart from the side sill by a predetermined distance;
a battery housing disposed below the underfloor panel, the battery housing including a side flange coupled to the connecting member, wherein the battery housing is configured to move relative to the connecting member and detach from the connecting member when the external force applied to the battery housing exceeds a threshold external force; and
a high-voltage battery housed in the battery housing.

12. The vehicle of claim 11, wherein the connecting member defines therein a closed space.

13. The vehicle of claim 11, wherein the side flange includes a mounting hole formed therethrough.

14. The vehicle of claim 13, wherein:
the connecting member includes a coupling hole formed vertically through the connecting member, and
the side flange and the connecting member are coupled to each other by a fastening element passing through the mounting hole and the coupling hole.

15. The vehicle of claim 14, wherein the coupling hole includes an expansion portion extending radially outward from the coupling hole.

16. The vehicle of claim 11, further comprising a mounting member connecting the mounting bracket to the side sill.

17. The vehicle of claim 11, wherein the mounting bracket is bent toward the connecting member from the side sill at a certain angle.

18. The vehicle of claim 17, wherein the mounting bracket includes a first member and a second member, and wherein the first member and the second member branch from the mounting bracket and are bent.

19. The vehicle of claim 18, wherein the first member is bent at a portion of the mounting bracket that is connected to the side sill and is coupled to a vertical surface of the connecting member.

20. The vehicle of claim 18, wherein the second member is bent at a portion of the mounting bracket that is connected to the side sill and is coupled to a horizontal surface of the connecting member.

* * * * *

UNITED STATES PATENT AND TRADEMARK OFFICE
CERTIFICATE OF CORRECTION

PATENT NO. : 11,955,650 B2
APPLICATION NO. : 17/406557
DATED : April 9, 2024
INVENTOR(S) : Seung Won An Page 1 of 1

It is certified that error appears in the above-identified patent and that said Letters Patent is hereby corrected as shown below:

In the Claims

In Column 6, in Claim 1, Line 58, delete "by" and insert -- by an --.

In Column 7, in Claim 7, Line 24, delete "to the" and insert -- to a lower side of the --.

In Column 7, in Claim 7, Line 27, delete "certain" and insert -- predetermined --.

In Column 7, in Claim 7, Line 27, delete "by" and insert -- by an --.

In Column 8, in Claim 11, Line 5, delete "to the" and insert -- to a lower side of the --.

In Column 8, in Claim 11, Line 6, delete "by" and insert -- by an --.

In Column 8, in Claim 17, Line 34, delete "certain" and insert -- predetermined --.

Signed and Sealed this
Fourteenth Day of May, 2024

Katherine Kelly Vidal
*Director of the United States Patent and Trademark Office*